United States Patent [19]

Mashayekhi et al.

[11] Patent Number: 5,149,447
[45] Date of Patent: Sep. 22, 1992

[54] CREOSOTE FILTRATION SYSTEM WITH A SHELL AND TUBE TYPE FILTRATION DEVICE

[75] Inventors: Mansour Mashayekhi, Huntington, W. Va.; Roger L. Haley, Russell, Ky.; Joe E. Payne, Maumelle, Ark.; C. Conrad Kempton, Morristown, N.J.

[73] Assignee: Allied-Signal Inc., Morris Township, Morris County, N.J.

[21] Appl. No.: 704,754

[22] Filed: May 23, 1991

[51] Int. Cl.⁵ .............................................. B01D 37/00
[52] U.S. Cl. .................................... 210/767; 210/143; 210/194; 210/196; 210/411; 210/433.1; 210/510.1; 210/791; 210/794; 210/805; 210/806
[58] Field of Search .................... 210/143, 194, 195.2, 210/196, 321.8, 321.78, 321.79, 321.72, 433.1, 510.1, 411, 650, 794, 767, 805, 502.1, 791, 774, 806, 739, 177

[56] References Cited

U.S. PATENT DOCUMENTS

| | | |
|---|---|---|
| 184,427 | 11/1876 | Riddle ............................... 210/794 |
| 4,032,454 | 6/1977 | Hoover et al. ................. 210/321.87 |
| 4,200,533 | 4/1980 | Gaddis et al. .................... 210/195.2 |
| 4,372,859 | 2/1983 | Sugimoto et al. .................. 210/794 |
| 4,816,160 | 3/1989 | Ford et al. ........................ 210/411 |
| 4,839,488 | 6/1989 | Katoh et al. ..................... 210/510.1 |
| 4,888,114 | 12/1989 | Gaddis et al. .................. 210/500.25 |
| 4,906,362 | 3/1990 | Holm, deceased et al. ..... 210/321.8 |
| 4,946,592 | 8/1990 | Galaj et al. ..................... 210/500.25 |
| 4,957,625 | 9/1990 | Katoh et al. ....................... 210/411 |

Primary Examiner—Robert A. Dawson
Assistant Examiner—Sun Uk Kim
Attorney, Agent, or Firm—Andrew N. Parfomak; Roger H. Criss

[57] ABSTRACT

A process and apparatus for the filtration of a creosote process stream laden with insoluble materials is provided. The apparatus comprises a filtration apparatus of a shell-and-tube configuration having filter material within for the separation of the xylene from the insolubles; the apparatus is comprised within a creosote filtration system which further includes a means for periodically backflushing the filtration system to reduce clogging of the filter material. The process and apparatus herein also finds use for filtration of other materials, including tars, pitches, and wastewaters.

19 Claims, 3 Drawing Sheets

CREOSOTE FILTRATION SYSTEM WITH A SHELL AND TUBE TYPE FILTRATION DEVICE

BACKGROUND

1. Field of the Invention

The present invention relates to filtration systems; more particularly the present invention relates to filtration and recovery systems for tar derivatives, particularly creosote.

2. Description of the Prior Art

As is known to the art, the distillation petrochemicals and coal-tars yields a variety of useful products. Of these, the fractionation products of the heavier organics include tars, pitches, and creosotes which is a useful material for the preservation of wood and wood products. This material, "creosote" may be described as a dark grey oily liquid derivative, with a specific density of about 1.06, a flash point of approximately 165 deg. F, and an ignition temperature of about 637 deg. F. The application of creosote by infusion into a wood article such as poles, masts, timbers, and the like which are to be exposed to the effects of weather and climate, is well known to provide the benefit of a longer service life to the article.

A typical process for the infusion of the creosote into an article includes the process steps of immersing the article to be infused in a vessel, or tank containing creosote, sealing the said vessel or tank to pressurize its contents and via the pressurization cause the infusion of creosote into the article so to permeate it completely so that the creosote permeates the fibrous structure of the wood. Afterwards, the article is removed and is ready for use.

While such processes provide useful methods for the treatment of articles, the steps of immersion and permeation under pressure frequently results in the loosening of debris, wood sugars, fibers, and other impurities from the wood being treated and the entrainment of the same within the creosote which limits the further utility of the creosote in the vessel or tank for further wood treatment. The use of creosote containing such debris, wood sugars, fibers etc. is undesirable as such materials have a tendency to adhere to the surface of an article and form a layer or coating of such impurities which is highly undesirable.

Simple filtration of creosote containing undesirable impurities is often ineffective as the creosote is highly viscous and difficult to pass through conventional filter media. Additionally, simple filtration of an impure creosote require the frequent replacement of filters as the entrained impurities are known to rapidly clog the filter media and substantially decrease the flow of the creosote through the filter medium.

In an alternative method known to the art, creosote containing such undesirable impurities may be distilled in a distillation column, or otherwise fractionated so to separate the creosote from undesirable impurities.

In light of the present level of the art, and of the desirable characteristics of the use of creosote as a wood preservative material, it should be apparent that there remains a continuing need in the art for improved processes for the filtration and purification of creosote, as well as improved filtration apparatus for effecting such filtration and purification.

SUMMARY

Generally, the present invention provides improvements in processes and apparatus for the filtration of fluid fractionation and distillation products of petroleum and coal.

In one aspect of the invention, there is provided an improved apparatus comprising a filter having a ceramic membrane filter which is utilized in a creosote filtration process.

In a further aspect of the invention there is provided an improved apparatus for use in a creosote filtration process which comprises a filter having a stainless steel filter element.

In yet another aspect of the invention there is provided an improved process for the filtration of a stream of creosote containing impurities which includes the process step of filtering the creosote stream through an apparatus having a ceramic membrane filter, or in the alternative, filtering the creosote stream through filter having a stainless steel filter element.

In further aspects of the invention, there are provided improvements in processes for the filtration and/or purification of a creosote stream containing impurities which process improvements include the process steps of: filtering the creosote stream through an apparatus having a ceramic membrane filter, or in the alternative, filtering the creosote stream through an apparatus having a stainless steel filter element; periodically halting the flow of the filtered creosote stream and reverse-flushing, or "backflushing" the filter.

In yet a further aspect of the present invention, there is provided an improved apparatus for the filtration and/or purification of a creosote stream containing impurities which apparatus comprises a filter having a ceramic membrane filter, or in the alternative, a stainless steel filter element; a reverse-flushing means for reverse-flushing, or "backflushing" the filter, and means for controlling "backflushing" operation, as well as methods for using the said improved apparatus.

DETAILED DESCRIPTION OF THE INVENTION AND EXAMPLES

Figure 1:
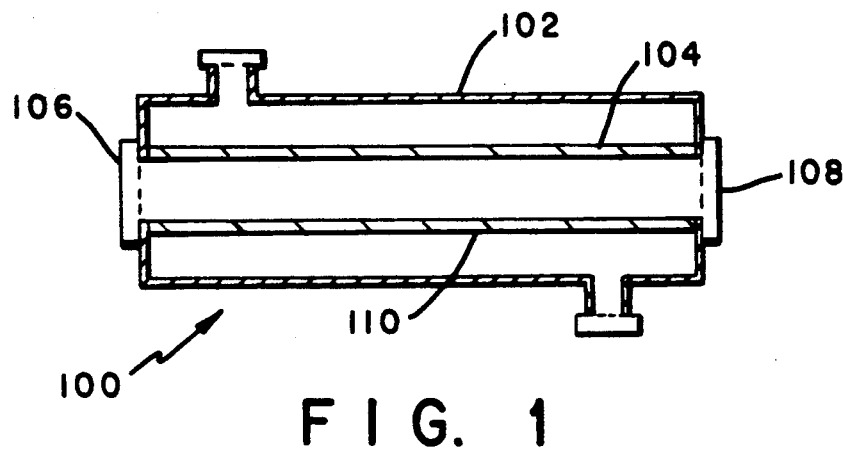
FIG. 1 depicts a representation of a preferred embodiment of the apparatus of the invention.

The present invention provides improvements in processes and apparatus for the filtration of fluid fractionation and distillation products of petroleum and coal. One such fluid, a product of the distillation of coal-tar, "creosote", may be characterized as a distillate of coal tar produced by the high temperature carbonization of bituminous coal which may be constituted of liquid and solid hydrocarbons, tar acids and tar bases. The creosote may be further characterized as an oily liquid, ranging in color from translucent brown to black, a flash point of approximately 165 deg.F, and ignition temperature of approximately 637 deg.F, and which may be further characterized as being only slightly soluble in water. The creosote finds utility in impregnating wood to impart good weathering properties and such impregnated wood includes articles such as poles or posts which will be exposed to the weather, i.e. telephone poles, posts to be used in pilings, mooring, docks, and in places wherein the wood will be at least partially immersed in a liquid such as water, and seawater. Other uses include timbers including railroad ties, and timbers used in erosion control, landscaping, etc. While creosote is preferred in the practice of the present invention, it is to be understood that other highly viscous liquids may enjoy the benefits of the use of the teachings herein, including but not limited to: creosote derivatives, creosote carbonate, creosote benzoate, creosote produced from wood, creosote oleate, creosote phosphate, creosote valerate, creosotic acid, as well as coal tar, tar, pitch, creo-emulsions, and heavy petroleum oils as well as wastewaters contaminated with such materials.

As it has been described above, wood is treated by immersing the wood in a tank containing creosote, which tank may be pressurized which infuses the wood with the creosote. Multiple treatments of wood utilizing the same mass or quantity of creosote is possible and frequently due to economic considerations, the creosote is reutilized until it reaches an undesirable level of impurities. As noted before, these impurities may comprise insolubles such as wood fibers, salts, as well as wood sugars, saps, and other naturally occurring materials which may have migrated from within the wood being treated in the treatment vessel. Such impurities are generally referred to hereinafter as "xylene insolubles".

The determination of the quantity of such impurities, or xylene insolubles is determined in accordance with the ASTM Standard Test Method for Xylene Insoluble (XI) content of Tar and Pitch, ASTM D 3671-78, as is described in the 1981 Annual Book of ASTM Standards, Part 15. Briefly stated, this test method includes the following here described. A sample of the creosote containing the xylene insolubles is provided to a beaker and 60 ml of xylene is added thereto, and stirred so to assure complete mixing of the sample. The beaker is then heated to 95 deg.C ± 5 deg.C and this temperature is maintained for 25 minutes. The contents of the beaker are occasionally stirred. Next, a tared, dehydrated aluminum sample thimble is placed in the upper end of a filter funnel and the contents of the beaker are slowly poured into the sample thimble, allowing the xylene from the sample thimble to drain away into the filter funnel and thereby be separated from the insolubles which are retained in the sample thimble. Subsequently, after all of the contents of the beaker are so transferred (a small amount of xylene may be used to flush out any further residual contents of the beaker), the xylene is allowed to drain, and the thimble is then placed in a sealed extraction apparatus. The apparatus is then operated for eighteen (18) hours. After the extraction operation, the apparatus is disassembled, the thimble removed and the remaining xylene allowed to evaporate for thirty (30) minutes. Then, the thimble containing the xylene insolubles is provided to a drying oven at 105 deg.C ± 5 deg.C for one (1) hour, after which the thimble and its contents are placed in a dessicator and allowed to cool. When cool, the thimble and contents are weighed to determine the amount of xylene insolubles in accordance with the following equation, Eq. [1]:

$$XI\% = 100\,[(B-A)/C] \qquad [1]$$

wherein "A" is the mass of the aluminum sample thimble, "B" is the mass of the aluminum sample thimble with the xylene insoluble materials, and "C" is the mass of the sample, in order to determine the percentage of xylene insolubles, "XI %", in the original sample. If the mass of the xylene insolubles is less than 150 mg or more than 250 mg, then the protocol described should be repeated with a new sample which will yield a mass of xylene insolubles of between 150 mg and 250 mg.

Typically, what is considered "clean creosote" comprises on the order of 0.2% by weight and less of xylene insolubles. What is considered as an "exhausted" creosote comprises generally in excess of about 2%, or more, of xylene insolubles. Creosote comprising a percentage of xylene insolubles between these two ranges is considered useful for further treatment of wood. It is to be understood that other percentages of xylene insolubles may be used as threshold values as to what is considered "clean", "exhausted" and useful creosote; the values used herein are citations of preferred embodiments of the present invention.

The apparatus and the process of the instant invention provides for the regeneration of an exhausted creosote by the separation of creosote from insolubles which may be entrained within it. Such is achieved by the use of an apparatus comprising a filtration system which is suitable for use either in a batchwise or a continuous mode. Said apparatus comprises a filtration system of a cross-flow type which in the most preferred embodiment is of a "shell-and-tube" configuration; in use an exhausted creosote composition is fed into one side of the said apparatus and wherein two process streams are produced, a first "regenerated" creosote process stream consisting essentially of clean creosote, and a second "contaminated" creosote process stream which comprises the xylene insolubles and creosote.

Turning now to FIG. 1, thereon is shown a preferred embodiment of the invention, a filtration apparatus generally labeled as 100 of the "shell-and-tube" type comprising a shell portion 102 forming a sealed annular chamber encasing a tube portion 104 contained within the tube portion 104 is comprised of a single tube having two ends, 106, 108 intermediate to which is a filter tube 110 which is composed of a material suitable for filtering xylene insolubles from a creosote process stream which may enter the interior of the tube 104.

Figure 2:
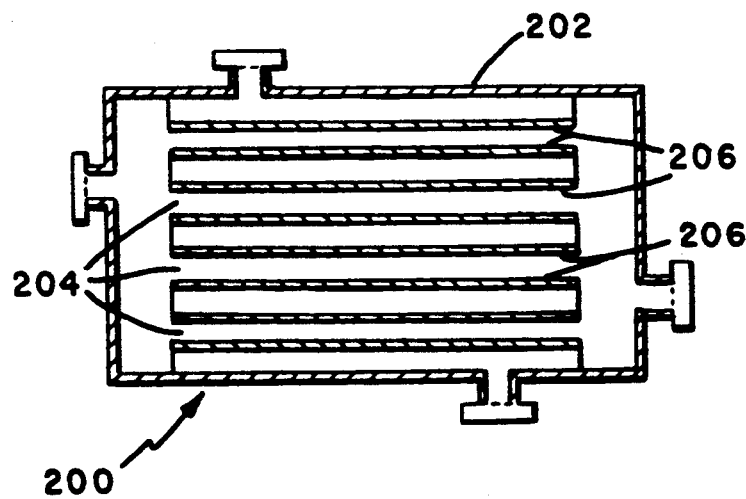
FIG. 2 depicts a representation of the most preferred embodiment of the apparatus of the present invention.

Turning now to FIG. 2, thereupon is shown an alternative embodiment, and the most preferred embodiment, of the filtration apparatus 200 which finds use in accordance with the present invention. This apparatus 200 is of the "shell-and-tube" type configuration and comprises a shell side 202 forming an annular chamber, and a plurality of tubes 204, each of which tubes 204 comprises tube walls 206 forming a filtration medium suitable for the separation of a creosote process stream containing xylene insolubles into a regenerated creosote process stream and a contaminated creosote process stream containing xylene insolubles. The filtration apparatus shown in FIG. 1 as well as FIG. 2 are substantially similar to conventional "shell-and-tube" type exchanges normally associated with heat transfer apparatus in the chemical process industries, and their construction and configuration are thus well known throughout the art. The substantial departure in the construction and configuration of the filter apparatus in accordance to the teachings of the present invention and conventional shell-and-tube type heat exchangers is in the construction of the tube walls, identified as 110 in FIG. 1, and as 206 in FIG. 2. Such tube walls comprised of or alternately comprising a material which is suitable for the separation of creosote from xylene insolubles entrains within, and may be any material which is suitable for separating the xylene insolubles from the creosote contained within a creosote process stream. In preferred embodiments, such materials include ceramic filters, such as ceramic membrane filters and metallic filters. Most preferably the material in the tube walls is a stainless steel filter membrane. The filtration material has an average pore size of between about 0.01 microns to about 50 microns, more preferably between about 0.1 microns and about 10 microns, and most preferably between about 0.25 and 2.5 microns.

It is to be understood that the preferred and most preferred ranges of average pore size have been determined empirically as a suitable balance between the tendency of the filter medium to entrained xylene insolubles upon its surface and thereby "clog" and, the size of xylene insolubles which are desirably removed from a creosote process stream, but other average pore sizes may also be specified as optimal for a particular process. The preferred materials, ceramic and metallic, are preferred as they allow for the filtration apparatus to operate at temperatures between about 200° F., and about 450° F. at which temperature the creosote process stream is fluid and has a reduced viscosity from those which might be observed at a lower temperature range.

A further feature regarding the filtration apparatus described herein, and the embodiments shown in FIGS. 1 and 2, is that such an apparatus of a "cross-flow" type; it is to be understood that such a cross-flow type apparatus is to be preferred as allows for the backflushing of the cross-flow apparatus in a manner to be described in conjunction with the following process.

The process of filtering the creosote containing xylene and solubles is accomplished by passing a process stream such as a contaminated creosote process stream into the filter apparatus and through the tubes of the filter apparatus; the creosote, which may contain a minor amount of xylene insolubles, passes through the filter material of the tube walls and into the annulus of the filter apparatus formed by the shell from which it may be collected and withdrawn, while the major proportion of the xylene insolubles originally present in the contaminated creosote process stream and creosote are retained within the interior of the tubes and are ultimately withdrawn. What is to be understood as "minor" and "major" proportions are percentages of less than 50% by weight and more than 50% by weight of the xylene insolubles of the contaminated creosote process stream provided to the apparatus. Preferably however, the creosote passing through the tube walls of the filter apparatus comprises less than 35% by weight of the xylene insolubles of the contaminated creosote process stream provided to the apparatus; most preferably less than 25% by weight.

A beneficial feature of the shell-and-tube type construction for the filter apparatus is that such a construction allows for the "backflushing" of the filter apparatus when an undesirable amount of xylene insolubles entrained and collected upon the interior of the tubes. As will be appreciated by one versed in the art, an excessive amount of xylene insolubles entrained upon the tubes restricts the flow of creosote through the filter material and into the shell-side of the apparatus wherein it may be collected with withdrawn and causes an undesirably high pressure drop across the tube walls and thereby undesirably reducing the operating efficiency of the filter apparatus. In a shell-and-tube type construction, is that the contaminated creosote process stream which is to be inlet into the filter apparatus may be periodically backflushed wherein a purging fluid be introduced into the shell side of the filter apparatus so to flow from the shell side through the filter medium of the tubes and into the tube side of the filter apparatus in a manner which is the reverse of the pattern of flow of the creosote being recovered. In such fashion, the purging fluid entrains the xylene insolubles collected within the interior of the tubes, particularly wall surfaces and forces them from the interior of the tubes, and does not necessitate the temporary cessation of the recovery process, although such a temporary cessation may be practiced in conjunction with the process and apparatus taught herein. The xylene insolubles are ultimately removed into the process stream and out of the outlet of the tube-side of the filter apparatus. As a purging fluid, any suitable fluid or gas may be used including but not limited to: organic fluids such as clean creosote, or in the alternative pressurized air, steam, or other gas. Of these, the preferred and the most preferred is pressurized steam.

During the operation of the filter apparatus, it is desirable that the backpressure across the filter apparatus be less than 50 psi, more preferably less than 35 psi, and most preferably be between 5-20 psi so to maintain a relative equilibrium in the system and reduce the tendency of fouling or "plugging" the filter material of the filter apparatus. Of course, it will be apparent to skilled practitioners in the art that the backpressure which is to be ultimately use in conjunction with a filter apparatus is strongly dependent upon the process conditions and material under which it is being used, for example, such conditions include but are not limited to; configuration of the filter apparatus, porosity of the filter material of the tubes within the filter apparatus, mass flow rate of the creosote (or other material) being provided to the filter apparatus, as well as other conditions. The optimal conditions for using such an apparatus may be determined by experimentation; particular systems and operating conditions are described in conjunction with the examples discussed below.

Further, during the operation of the filter apparatus, it is desirable that the temperature of the creosote entering the filter apparatus be at a sufficiently high temperature so to assure, or to minimize the formation of salts of the xylene insolubles while the creosote is within the filter apparatus. Maintenance of such a sufficiently high temperature assures good flow characteristics (due to lower viscosity), and minimal formation of salts within the filter apparatus which contributes to clogging of the filter material, and consequently an increase in pressure drop across the filter apparatus.

The filter apparatus may form a unit of a larger creosote filtration system wherein creosote is recycled, recovering the clean creosote and withdrawing and separating these xylene insolubles from a contaminated creosote process stream.

Further it is contemplated that a plurality of filter apparatus may be used as part of a creosote filtration system wherein the plurality of filter apparatus may be connected in series, wherein the outlet of one would provide the inlet to the next filter apparatus in the series, or in the alternative, where the plurality of filter apparatus may be connected in a parallel manner so that a plurality of filter apparatus may be operated, or to allow the diversion of the contaminated creosote stream to one of the plurality of filter apparatus so to allow for the backflushing, periodic maintenance or repair of the filter apparatus.

Figure 3:
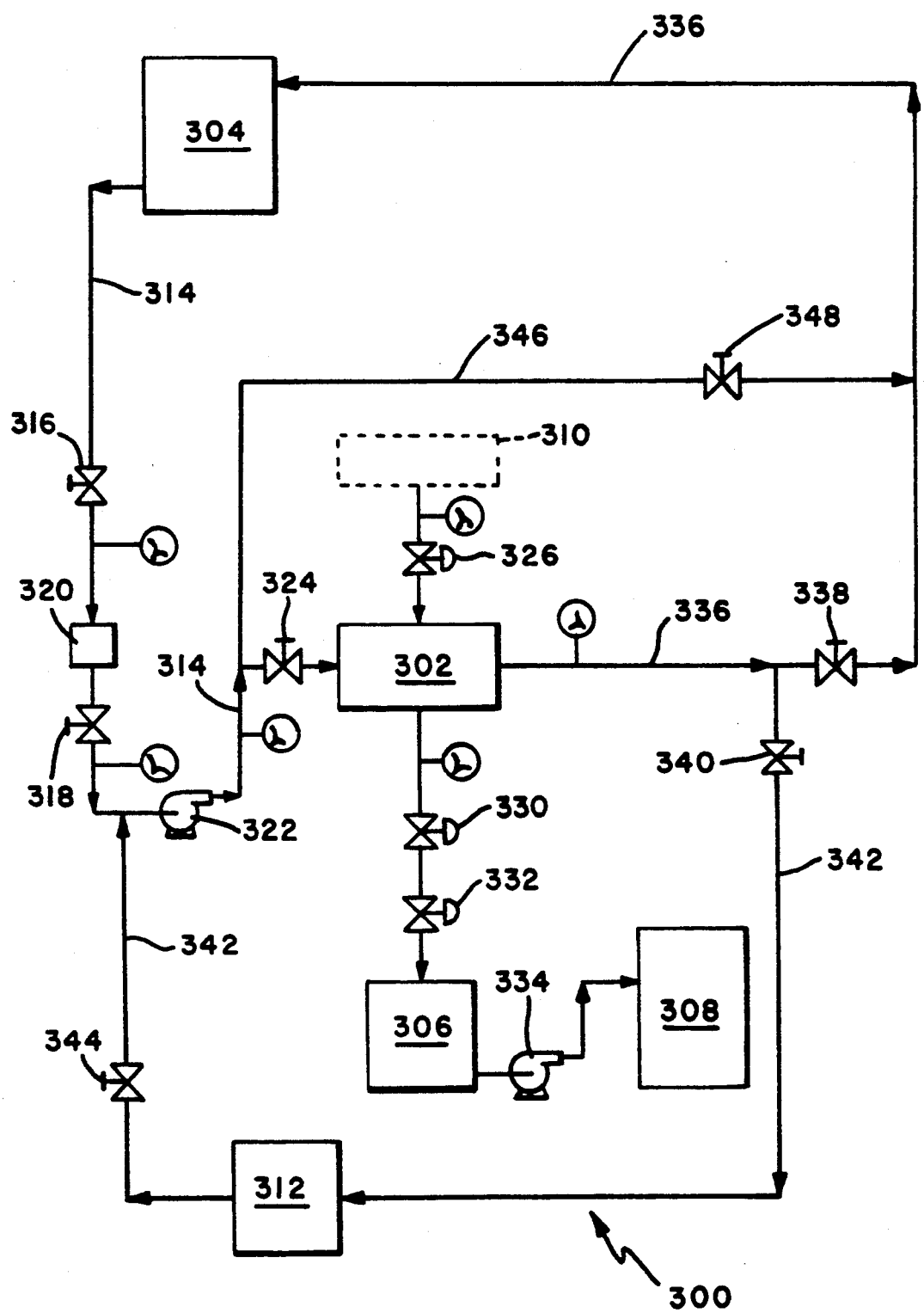
FIG. 3 illustrates a process apparatus of the preferred embodiment of a creosote filtration system of the present invention.

Turning to FIG. 3, is shown a creosote filtration system 300, which includes a filter apparatus 302, a feed tank 304, a clean creosote catch tank 306, a recovered creosote tank 308, a steam supply 310 and a wash tank 312. With particular attention now to FIG. 3, the feed tank 304 generally represents a source of contaminated creosote which will need to be recycled, which is accomplished by recovering the creosote and removing at least a portion of the xylene insolubles therefrom. Feed tank 304 is to be understood to be representative of a large storage vessel or container, or more preferably represents one of a plurality of creosote treatment vessels within which a wood article is to be immersed, the vessel sealed for sufficient time and under sufficient physical conditions to cause the permeation of the creosote into the wood article, wherein such creosote treatment tank may be selectively coupled to a contaminated creosote stream 314 which contains creosote and xylene insolubles. The contaminated creosote stream 314 may optionally be controlled by a shut-off valve 316 and 318 which are positioned at opposite sides of a supplemental strainer 320. The supplemental strainer 320 is an optional unit in the process but its use is preferred as it is useful in the separation of large particles, preferably those about 2000 to 3000 microns and greater in size, which may be entrained in the contaminated creosote. The supplemental strainer itself may be any useful filtration apparatus but is preferably filtration device which may be readily cleaned by an operator and which comprises a reusable filter element. Preferably, the supplemental strainer comprises a plurality of metallic filters i.e., stainless steel filter baskets, i.e., having a pore size of about 2000 to 3000 microns and larger. The use of such a supplemental strainer 320 prefilters the creosote process stream before it enters the feed pump 322 located downstream from the supplemental strainer 320 and further reduces the amount of xylene insolubles which are to be supplied to the filter apparatus 302. The contaminated creosote stream passes through a feed pump 322 which, in turn, pumps the contaminated creosote stream 314 through a further valve 324 and into the tube-side inlet of a filter apparatus 302.

The filter apparatus 302 may be any of those which have been generally described before; in particularly the filter apparatus may be one or more filter apparatus as disclosed in FIGS. 1 or 2 and described above.

A steam supply 310 passes through a control valve 326 and to a port or inlet on the shell side of the filter apparatus 302. From a further port from the shell-side of the filter apparatus 302 is connected a creosote recovery line 328 which passes through a back pressure regulator 330 and a further control valve 332 which is in turn connected to the inlet of a clean creosote catch tank 306 described before. An outlet from the clean creosote recovery tank passes to a creosote recovery pump 334 which, in turn may be used to supply recovered creosote to the clean creosote tank 08. Further from the filter apparatus 302, is connected a creosote recycle line 336 which is connected to an outlet from the tube side of the filter apparatus 302. The creosote recycle line 336 in turn is connected to two valves, 338 and 340. The creosote recycle line 336 passing through valve 338 continues and ultimately returns to the creosote feed tank 304.

The pressure throughout the system as shown on FIG. 3 may be determined by the use of the pressure indicators, "P" which are attached at various points to lines within the system.

A wash line 342 passes from valve 340 and is connected to an inlet in the wash tank 312 and further passes from an outlet of the wash tank 312 through a further valve 344 before it is joined with the creosote process stream line 314 prior to the inlet of feed pump 322. The system further comprises a bypass line 346 which is connected from the outlet of feed pump 322 and via the valve 348 communicates with the creosote recycle line 336 so to feed directly into the creosote feed tank 304 and wholly by-passing the filter apparatus 302.

A process for utilizing the system is as follows: A creosote process stream containing an undesirable level of xylene insolubles, typically an amount considered in excess of that determined acceptable for "clean" creosote, is removed from the creosote feed tank 304 and while valve 316 is open, passes through supplemental strainer 320. Within the supplemental strainer 320, those xylene insolubles in excess of about 2000 to 3000 microns in size are entrained before the creosote process stream exits the supplemental strainer 320 and while valve 318 is opened, passes to the feed pump 322. Valves 316 and 318 may be selectively opened or closed to temporarily halt the flow of the creosote process stream so to allow for the changing or cleaning of the filters within the supplemental strainer 320. The feed pump 322 passes the contaminated creosote stream 314 while valve 348 remains closed and valve 324 is open into the inlet of the tube-side of a filtration apparatus 302. The creosote process stream entering the tube-side of the filter apparatus 302 passes into the tubes wherein the contaminated creosote stream is separated into two streams, a first stream, or "clean" creosote stream comprising creosote and a minor proportion of the xylene insolubles which were present in the contaminated creosote stream line 314 which passe across the filter material of the tubes (not shown) and into the shell-side of the filter apparatus 302, and a second stream, a recycled creosote stream which comprises a major portion of the xylene insolubles which were present in the contaminated creosote stream line 314. The xylene insolubles which are not entrained upon the surface walls of the filter material passes with creosote to the outlet of the tubes within the tube side of the filter apparatus 302 and into recycled creosote line 336. The recycled creosote stream passes through recycled creosote line 336 which passes through valve 338 while open and while valve 340 remains closed, the recycled creosote stream is returned to the feed tank 304. The clean creosote stream which has passed through the filter material of the tubes within the filter apparatus 302 and which is collected on the shell-side of the filter apparatus 302, is withdrawn through clean creosote line 328 through back-pressure regulator 330 and, while control valve 332 downstream from the back pressure regulator 330 is open, the clean creosote stream flows into a clean creosote catch tank 306. While the creosote collected in the clean creosote catch tank 306 may be retained therein, it is often desirable to remove the clean creosote therefrom. An outlet from the clean creosote catch tank 306 leads to a clean creosote pump 334 which, in turn, is used to withdraw the clean creosote retained in the clean creosote catch tank 306 and supply it to a clean creosote tank 308.

The clean creosote which is recovered from the filter apparatus 302 may be reutilized for further processing of wood, or alternately may be utilized in a different process requiring the use of creosote not particularly described herein.

During normal treatment operations, the creosote which is used to impregnate wood may be continuously or in the alternative, periodically recycled utilizing the filter apparatus and the creosote filtration system taught herein. When the xylene insolubles within the creosote are in excess of a desired maximum xylene insolubles so that the creosote is considered "contaminated", such as in excess of about 1% xylene insolubles within the feed tank, the creosote containing the undesired amount of xylene insolubles may be provided to the contaminated passes through the contaminated creosote stream line 314 and through valve 316 into the supplemental strainer 320 wherein any xylene insolubles having a particle size in excess of about 2000 to 3000 microns are removed. Exiting the supplemental strainer 320, the contaminated creosote process stream then passes through the open valve 318 and into the creosote feed pump 322 wherefrom it is pumped through open valve 324 and into the inlet of the tube side of the filter apparatus 302. The creosote is then filtered by the action of the filter apparatus 302 wherein the contaminated creosote stream entering the filter apparatus is separated, the clean creosote passing through the filter medium of the tubes (not shown) and into creosote recovery line 328, through beck-pressure regulator 330 and open control valve 332 into clean creosote catch tank 306 where it may be retained. The portion of the creosote which retains the major amount of xylene insolubles which have not adhered to the interior of the tubes passes into creosote recycle line 336 through open valve 338 and ultimately is returned to creosote feed tank 304. As such, it may be seen that the creosote of the feed tank 04 when provided to the creosote filtration apparatus as shown in FIG. 3 is separated in the filter apparatus 302 wherein a fraction of the creosote is recovered as clean creosote having a xylene insolubles content of less than about 0.25% and is recovered into creosote or clean creosote catch tank 306. Creosote which has been recovered may be removed from the clean creosote catch tank 306 to a larger storage or holding vessel such as the clean creosote tank 308 by means of a pump such as creosote pump 334 wherefrom it may be used as a clean creosote feed stock for a wood treating application or for any other purpose by way of example, the recovered clean creosote may be returned to the creosote feed tank 304 and used for further treatment of wood.

Periodically, recycling of the creosote using the process and the filter apparatus 302 described above suffers a deterioration in its efficiency due to the entrainment of xylene insolubles upon the interior of the tubes of the filter apparatus 302. As such the xylene insolubles "clog" the filter material and reduce undesirably the passage of clean creosote there through and ultimately into clean creosote catch tank 306. It has been found advantageous to periodically reverse-flush or "backflush" the filter apparatus 302 through the action of steam supplied by steam supply 310 to remove the xylene insolubles entrained upon the tubes. In such a backflushing process, the clean creosote stream 328 is periodically halted by the action of control valve 332 so as to halt the further filtration of the creosote. Next, control valve 332 and/or back pressure valve 330 is closed so to halt the passage of any clean creosote from the shell-side of the filter apparatus 302 to the clean creosote catch tank 306. Next, steam is inlet from these steam supply 310 by opening the control valve 326 for a sufficient period of time so to back flush the shell-side of the filter apparatus 302 and in such a manner force steam through the filter medium from the shell-side through the tube side and entrain the xylene insolubles which may have collected upon the tube side of the filter apparatus 302 and carry them to the outlet of the tube side of the filter apparatus 302 and into creosote recycled length 336. Preferably, the steam is supplied to the filter apparatus 302 by opening the control valve 326 for a period of between about 3 seconds to about 60 seconds, although the amount of time may vary depending upon the degree of fouling of the tube walls and of the size configuration and type of filter apparatus 302. The xylene insolubles which have been so flushed then pass through the recycled creosote line where they are ultimately returned to the feed tank 304. After back flushing of the filter apparatus 302, control valve 326 is closed, control valve 332 and back pressure regulator 330 is opened and valve 324 is also opened so to allow for the further filtering of the creosote process stream 314. The backflushing operation is repeated periodically in order to satisfy the operating condition of the particular creosote filtration apparatus and system used. During the backflushing operation, the creosote process stream 314 is allowed to continue its passage through the filter apparatus 302.

Periodically, after periods of prolonged and/or heavy use of the filter apparatus 302 which may cause excessive fouling of the interior and the exterior of the tubes, or in the alternative in the instance of mechanical failure of the filter apparatus 302, it may be desirable to at least partially disassemble and manually clean the and manually clean the filter apparatus 302. This may be readily accomplished by closing valves 324, 338, and control valve 226, and opening valve 348. Closing such valves allows for the unhibited flow of the creosote process stream 314 which will return via the by-pass line 34 and into the recycled creosote line 336, and allows for the filter apparatus 302 to be at least partially disassembled and/or manually cleaned. The filter apparatus, in its preferred embodiment as a "shell-and-tube" configuration may be mechanically disassembled for cleaning and cleaned in accordance with conventional procedures known to the chemical process industries.

A filter washing system which comprises valve 340, wash line 342, wash tank 312, valve 344 is also provided in the creosote filtration system. While forming an optional constituent of the system, the incorporation of such a wash system is desirable as during periods of prolonged shut down of the creosote filtration system, it is highly desirable to flush the filter apparatus 302 so as to minimize the amount of xylene insolubles contained therein such as particularly desirable especially wherein the temperature of the filter apparatus 302 is to be reduced below its normal operating temperature and to a temperature at which the xylene insolubles, particular salts of creosote, and any naturally occurring sugars which may be entrained and originally produced by the wood being treated in the feed tank 304 may occur. In such a wash system, the wash tank 312 contains a sufficient amount of a suitable solvent such as, kerosene, acetone, so called "LCOR-oil" a light carbolic oil residue which may be fractionated from creosote, of which kerosene is most preferred. Such a solvent is effective in dissolving at least a portion of the xylene insolubles within the filter apparatus 302.

During a filter wash process, it is presumed that the creosote supply 314 has been halted. In the filter wash process, valves 318, 348, 338, control valve 326, and control valve 332, and back-pressure regulator 330, are closed. Valve 324 is allowed to remain open and valves 340, and 344 are opened. Feed pump 322 is then operated to circulate the wash fluid contained within the wash tank 312 through the tube side of the filter apparatus 302 for a sufficient interval so to assure the removal of at least a part of the xylene insolubles entrained within the filter apparatus 302. Preferably, the wash system is operated until a substantial portion of the xylene insolubles within the filter apparatus 302 are flushed therefrom; what is to be understood by "substantial portion" is in excess of 50% of the xylene insolubles contained within the filter apparatus 302 at the time of the initiation of the wash process.

Figure 4:
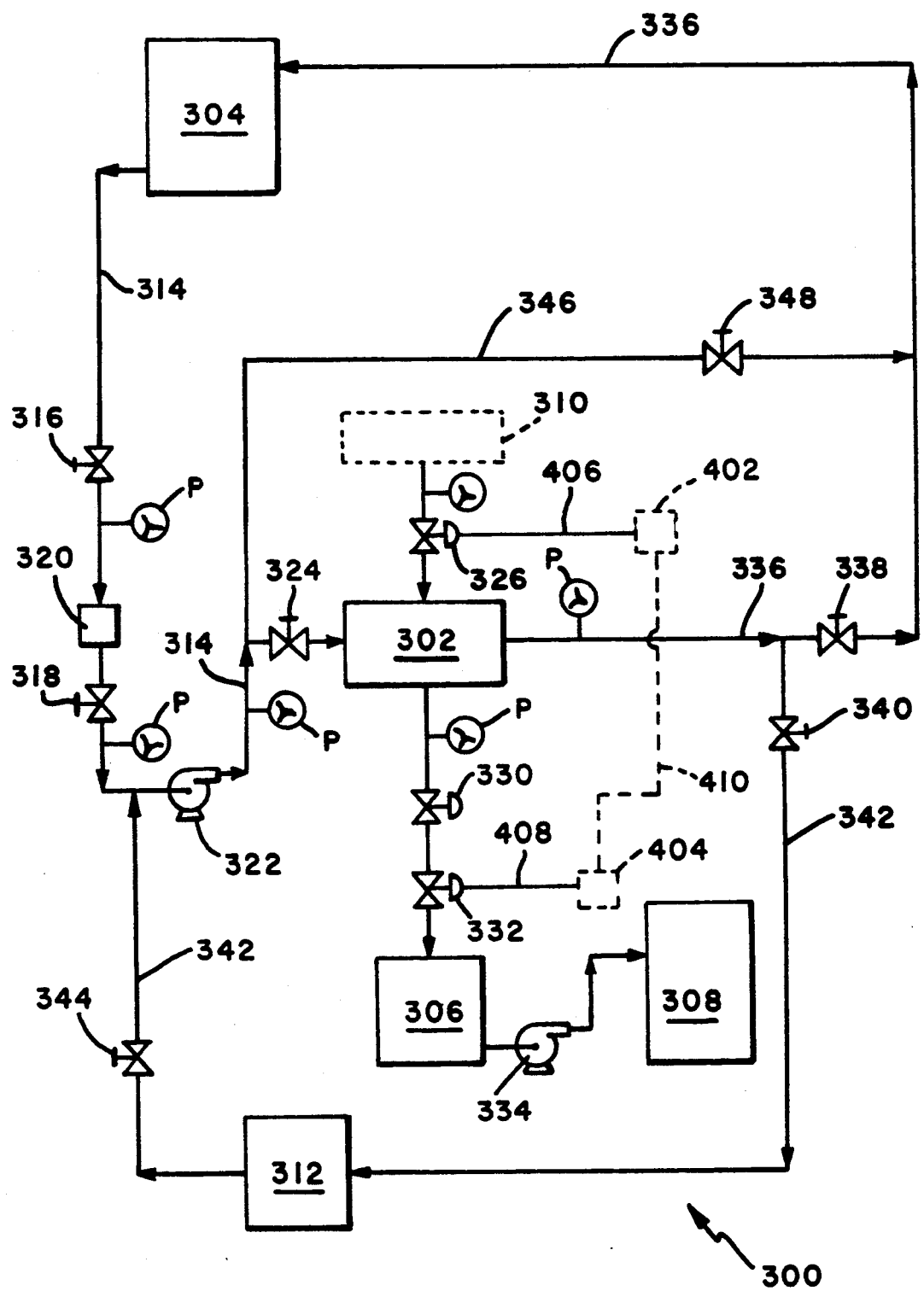
FIG. 4 depicts the creosote filtration system shown on FIG. 3, which further includes control means.

FIG. 4 depicts the creosote filtration system shown on FIG. 3, which further includes control means for controlling the process steps of backflushing the filter apparatus. The elements of FIG. 3 which also appear on FIG. 4 bear common reference numbers or reference letters and are to be understood as representing common elements.

The creosote filtration system 300 includes two controllers, 402, 404 which communicate along lines 406, 410 with respective control valves 326 and 332. The controllers 402, 404 operate to alternately restrict and allow the passage of their respective streams, in a manner wherein while control valve 326 is open, control valve 332 is closed, and the reverse. The controllers may be of any type including but not limited to; pneumatic, electrical, electronic (including digital or analog), or in the alternative the controllers may be two controllers communicating intermediate to one another along a line, such as 410, or the controllers 402, 404 may be elements of a single control unit, such as a microprocessor control unit, a bank of timers, or the like.

During operation of the creosote filtration system, controller 402 keeps control valve 326 closed to deny the passage of steam into the filter apparatus 302 while controller 404 keeps control valve 332 open so to allow the passage of clean creosote exiting the filter apparatus 302 into the clean creosote catch tank 306. Periodically, controller 404 causes control valve 332 to close, and controller 402 causes control valve 326 to open so to allow steam to enter the filter apparatus 302 and perform a backflushing operation. Afterwards, controller 402 closes control valve 326 to deny the further passage of steam into the filter apparatus 302 while controller 404 opens control valve 32 so to again allow the passage of clean creosote exiting the filter apparatus 302 into the clean creosote catch tank 306. The time intervals for this operation may be varied to suit the particular creosote recovery system; preferably the time interval during which steam enters the filter apparatus 302 is equal to the time interval when steam does not enter the filter apparatus 302; preferably and most preferably the time interval during which steam (or other purging fluid) is allowed to enter the filter apparatus is less than the time interval during which steam does not enter the filter apparatus 302, and further, that such time intervals are regularly repeating, or periodic.

As has been noted before, the filter apparatus 302 and the creosote filtration system 300 described particularly herein in conjunction with a process for the recovery of creosote may be used with other materials. These include various distillates and fractionation products of petroleum and coal, including coal tar, tar, pitch, creoemulsions, and heavy petroleum oils, as well as wastewaters contaminated with such materials.

The foregoing invention will be more apparent by reference to specific embodiments which are representative of the invention. It is nonetheless to be understood that the particular embodiments described herein are provided for the purpose of illustration, and not be means of limitation, and that it is to be further understood that the present invention may be practiced in a manner which is not exemplified herein without departing from its scope.

EXAMPLE 1

A creosote filtration system substantially as shown on FIG. 4 comprised the following elements: the supplemental strainer 320 was a basket strainer of stainless steel having 1-2 mm openings; the feed pump 322 was a positive displacement pump providing 7-10 ft/sec of creosote to the filter apparatus 302 at a pressure of between 50 psi and 100 psi; the filter apparatus 302 comprised a porous single stainless steel tube of approximately 60 inches in length and 0.5 inch nominal diameter, having an average pore size of 2 microns, an average wall thickness of 0.06 inches which was encased in a larger 8 inch nominal diameter stainless steel pipe so to form a "shell-and-tube" type configuration. Back pressure regulator 330 was high flow type, $CV=2.0$, type, rated for 0-100 psi, the clean creosote catch tank 306 and the wash tank were both vessels having a 100 gallon capacity, the feed tank 304 was of 10,000 gallon capacity, and had an outlet at a point approximately six feet above the bottom of the tank (allowing for the settling of a portion of the xylene insolubles to the bottom of the tank); the balance of the components of the system include conventional valves, pressure gauges, etc.

The steam supply 310 provided saturated steam at 350 deg.F, 130 psi and at a rate of 1200 lbs/hour.

To each of the two control valves 326 and 332 were attached an electronic timer for controlling the open and close time of each of the control valves 326, 332.

In an operational mode, the creosote of the feed tank was maintained in the temperature range of approximately 180-220 deg.F, so to decrease the viscosity of the creosote within the feed tank 304 and consequently throughout the creosote filtration system 300. The creosote temperature should be maintained above 140 deg.F, and more preferably above 160 deg.F so to reduce the viscosity of the creosote within the filtration system, and further, to elevate the temperature of the creosote and dissolved xylene insolubles entrained within the creosote so to reduce the rate of precipitation of xylene insolubles. Such an elevated temperature was found to beneficially reduce the rate of clogging of the filter material within the filter apparatus 302, reduce the pressure drop across the filter apparatus 302, and consequently maintain a more consistent flow velocity of the creosote passing through the filter apparatus 302 and the creosote filtration system. The creosote containing the xylene insolubles was pumped through the filter apparatus 302 at a velocity of between about 7 and 10 ft/sec., and the filtration pressure was maintained between about 70 psi and about 100 psi.

The electronic timers controlling the operation of control valves 326 and 332 were operated in a periodic cycle, which cycle was as follows: control valve 332 was allowed to remain open for an interval of 15 to 20 minutes, while simultaneously, control valve 326 was held closed; following this interval, control valve 332 closed and simultaneously control valve 326 was opened and held open for a time interval of 20 to 30 seconds, after which control valve 326 was closed and control valve 332 simultaneously opened. The times during which valves remained opened or closed increased within their respective ranges for longer and longer times so to allow for a more effective backflushing operation which was necessitated with a highly clogged filter apparatus 302.

For a 24 hour operational run of the system, the following mass balance was realized. At the start of the run, feed tank 304 contained approximately 10,000 gallons of creosote having an XI of 0.7%; no creosote was in the recovered creosote tank 308. The system was operated as described above, and at the conclusion of 24 hours of continuous operation, the feed tank 304 contained approximately 5,000 gallons of creosote of XI of 3.2%, and approximately 5,000 gallons of creosote having an XI of 0.02%.

It will become apparent to those skilled in the art that the present creosote filtration system allows for the recovery of clean creosote from a creosote process stream comprising an undesirable amount of xylene insolubles, as well as other impurities. The creosote so recovered may be utilized the process from whence it was generated or in the alternative may be removed and utilized in a further process. A further advantageous feature of the process and apparatus taught in the instant specification is the reduction of the amount of solid wastes recovered from a creosote system which is both technical and environmental merit.

It will be appreciated that the instant specifications and examples set forth herein are by way of illustration and not limitation, and that various modifications and changes may be made without departing from the spirit and scope of the present invention, whose limitations are bounded only by the appendant claims.

We claim:

1. A creosote filtration apparatus which comprises:
   a filtration device having a shell and at least one tube wherein said tube is constructed of ceramic or metallic filter material wherein the filtration device is adapted to separate a creosote stream containing xylene insolubles entering the filtration device through an inlet in communication with the tube into a first stream containing a first concentration of xylene insolubles and removing said first stream through an outlet, and into a second stream containing a second concentration of xylene insolubles and removing said second stream through an outlet wherein the first concentration is greater than the second concentration,
   a feed tank containing creosote and in communication with the at least one tube via an inlet to the filtration device,
   a steam supply in communication with the shell-side of the filtration device via an inlet to the filtration device,
   a creosote recycle line connecting the outlet of the first stream with the feed tank,
   a creosote catch tank in communication with the outlet for the second stream from the filtration device.

2. The creosote filtration apparatus according to claim 1 which further comprises:
   a wash line in communication with the outlet of the filtration apparatus used for removing the said first stream, and further in communication with the inlet to the tube of the filtration device, and,
   a wash tank containing a solvent effective in dissolving at least a portion of the xylene insolubles within the filter apparatus.

3. The creosote filtration apparatus according to claim 1 which further comprises:
   a bypass line in communication with the inlet of the filtration apparatus and further in communication with the creosote feed tank.

4. The creosote filtration apparatus according to claim 1 wherein the filter material has an average pore size in the range of between about 0.01 microns and about 50 microns.

5. The creosote filtration apparatus according to claim 4 wherein the tube is constructed of stainless steel.

6. The creosote filtration apparatus according to claim 1 wherein the filter material has an average pore size in the range of between about 0.1 microns and about 10 microns.

7. The creosote filtration apparatus according to claim 1 which further comprises:
   a control valve intermediate the steam supply and the inlet to the filtration device, and,
   a controller for limiting the operation of the control valve for limiting the passage of steam from the steam supply to the shell-side of the filtration device.

8. A creosote filtration apparatus which comprises:
   a filtration device having a shell and at least one tube wherein said tube is constructed of ceramic or metallic filter material wherein the filtration device is adapted to separate a creosote stream containing xylene insolubles entering the filtration device through an inlet in communication with the tube into a first stream containing a first concentration of xylene insolubles and removing said first stream through an outlet, and into a second stream containing a second concentration of xylene insolubles and removing said second stream through an outlet wherein the first concentration is greater than the second concentration,
   a feed tank containing creosote and in communication with the at least one tube via an inlet to the filtration device,
   a steam supply in communication with the shell-side of the filtration device via an inlet to the filtration device,
   a creosote recycle line connecting the outlet of the first stream with the feed tank,
   a creosote catch tank in communication with the outlet for the second stream from the filtration device.
   a wash line in communication with the outlet of the filtration apparatus used for removing the said first stream, and further in communication with the inlet to the tube of the filtration device,
   a wash tank containing a solvent effective in dissolving at least a portion of the xylene insolubles within the filter apparatus, and,
   a bypass line in communication with the inlet of the filtration apparatus and further in communication with the creosote feed tank.

9. The creosote filtration apparatus according to claim 8 wherein the filter material has an average pore size in the range of between about 0.1 microns and about 10 microns.

10. A process for the filtration of xylene insolubles within a creosote process stream which comprises the steps of:
   providing a creosote filtration apparatus which comprises:
      a filtration device having a shell and at least one tube wherein said tube is constructed of ceramic or metallic filter material wherein the filtration device is adapted to separate a creosote stream containing xylene insolubles entering the filtration device through an inlet in communication with the tube into a first stream containing a first concentration of xylene insolubles and removing said first stream through an outlet, and into a second stream containing a second concentration of xylene insolubles and removing said second stream through an outlet wherein the first concentration is greater than the second concentration,
      a feed tank containing creosote and in communication with the at least one tube via an inlet to the filtration device,
   providing a heated process stream of creosote containing xylene insolubles to the tube of the filtration apparatus, and
   separating the heated process stream of creosote containing xylene insolubles within the filtration device into a first stream containing a first concentration of xylene insolubles and removing said first stream through an outlet, and into a second stream containing a second concentration of xylene insolubles and removing said second stream through an outlet wherein the first concentration is greater than the second concentration.

11. The process according to claim 10 which further includes the process steps of:
   providing;
      a steam supply in communication with the shell-side of the filtration device via an inlet to the filtration device,
      a creosote recycle line connecting the outlet of the first stream with the feed tank,
      a creosote catch tank in communication with the outlet for the second stream from the filtration device,
   recycling the first stream to the feed tank,
   collecting the second stream in the creosote catch tank.

12. The process according to claim 11 which further includes the process step of:
   periodically interrupting the collection of the second stream, and,
   inletting steam from the steam supply to the shell-side of the filtration device for a period sufficient to dissolve at least a portion of the xylene insolubles entrained within the filter material.

13. The process according to claim 12 which further includes the process steps of:
   providing:
      a control valve intermediate the steam supply and the inlet to the filtration device, and,
      a controller for limiting the operation of the control valve for limiting the passage of steam from the steam supply to the shell-side of the filtration device,
   operating the controller so to periodically inlet steam from the steam supply to the shell-side of the filtration device for a period sufficient to dissolve at least a portion of the xylene insolubles entrained within the filter material.

14. The process according to claim 10 which further includes the process steps of:
   providing;
      a wash line in communication with the outlet of the filtration apparatus used for removing the first stream, and further in communication with the inlet to the tube of the filtration device,
      a wash tank containing a solvent effective in dissolving at least a portion of the xylene insolubles within the filtration apparatus, and,
      a bypass line in communication with the inlet of the filtration apparatus and further in communication with the creosote feed tank,
   periodically interrupting the flow of the creosote process stream through the filtration device and circulating it through the bypass line, and,
   circulating at least a portion of the solvent in the wash tank through the tube of the filtration apparatus via the inlet and dissolve at least a portion of the xylene insolubles entrained within the filter material and withdrawing the solvent from the filtration apparatus through the outlet used for removal of the first stream, and returning the solvent to the wash tank.

15. The process according to claim 10 wherein the filter material has an average pore size in the range of between about 0.01 microns and about 50 microns.

16. The process according to claim 10 wherein the heated creosote stream is at a temperature of at least about 140° F.

17. A process for the concentration of xylene insolubles within a creosote process stream which comprises the steps of:
   providing a creosote filtration apparatus which comprises:
      a filtration device having a shell and at least one tube wherein said tube is constructed of ceramic or metallic filter material wherein the filtration device is adapted to separate a creosote stream containing xylene insolubles entering the filtration device through an inlet in communication with the tube into a first stream containing a first concentration of xylene insolubles and removing said first stream through an outlet, and into a second stream containing a second concentration of xylene insolubles and removing said second stream through an outlet wherein the first concentration is greater than the second concentration,
      a feed tank containing creosote and in communication with the at least one tube via an inlet to the filtration device,
      a steam supply in communication with the shell-side of the filtration device via an inlet to the filtration device,
      a creosote recycle line connecting the outlet of the first stream with the feed tank,
      a creosote catch tank in communication with the outlet for the second stream from the filtration device,
   providing a heated process stream of creosote containing xylene insolubles to the tube of the filtration apparatus, and
   separating the heated process stream of creosote containing xylene insolubles within the filtration device into a first stream containing a first concentration of xylene insolubles and removing said first stream through an outlet, and into a second stream containing a second concentration of xylene insolubles and removing said second stream through an outlet wherein the first concentration is greater than the second concentration, recycling the first stream to the feed tank, collecting the second stream in the creosote catch tank, periodically interrupting the collection of the second stream, and, inletting steam from the steam supply to the shell-side of the filtration device for a period sufficient to dissolve at least a portion of the xylene insolubles entrained within the filter material and recycling the first stream to the feed tank.

18. The process according to claim 17 wherein the filter material has an average pore size in the range of between about 0.01 microns and about 50 microns.

19. The process according to claim 17 wherein the heated creosote stream is at a temperature of at least about 140° F.

* * * * *